United States Patent
Lin et al.

(10) Patent No.: US 8,325,304 B2
(45) Date of Patent: Dec. 4, 2012

(54) METHOD OF FABRICATING LIQUID CRYSTAL DISPLAY

(75) Inventors: Cho-Ying Lin, Yunlin County (TW); Ding-Jen Chen, Chiayi County (TW); Hui-Min Lin, Kaohsiung County (TW); Yang-Ching Lin, Pingtung County (TW)

(73) Assignees: Taiwan TFT LCD Association, Hsinchu (TW); Chunghwa Picture Tubes, Ltd., Taoyuan (TW); AU Optronics Corporation, Hsinchu (TW); Hannstar Display Corporation, New Taipei (TW); Chi Mei Optoelectronics Corporation, Tainan County (TW); Industrial Technology Research Institute, Hsinchu (TW)

( * ) Notice: Subject to any disclaimer, the term of this patent is extended or adjusted under 35 U.S.C. 154(b) by 455 days.

(21) Appl. No.: 12/592,677

(22) Filed: Nov. 30, 2009

(65) Prior Publication Data

US 2011/0096286 A1    Apr. 28, 2011

(30) Foreign Application Priority Data

Oct. 27, 2009 (TW) ............... 98136316 A (51) Int. Cl.
 *G02F 1/1337* (2006.01)
 *G02F 1/141* (2006.01)
(52) U.S. Cl. ......... 349/124; 349/127; 349/129; 349/133
(58) Field of Classification Search ............ 349/127, 349/129, 133
See application file for complete search history.

(56) References Cited

U.S. PATENT DOCUMENTS

| | | | | |
|---|---|---|---|---|
| 5,539,074 | A * | 7/1996 | Herr et al. | 526/326 |
| 5,602,661 | A * | 2/1997 | Schadt et al. | 349/124 |
| 5,808,716 | A | 9/1998 | Gass et al. | |
| 6,177,972 | B1 | 1/2001 | Held et al. | |
| 6,222,605 | B1 | 4/2001 | Tillin et al. | |
| 6,597,422 | B1 | 7/2003 | Funfschilling et al. | |
| 7,911,562 | B2 * | 3/2011 | Okabe et al. | 349/86 |
| 2006/0055858 | A1 | 3/2006 | Nakanishi et al. | |
| 2008/0062354 | A1 | 3/2008 | Ho et al. | |
| 2010/0141881 | A1 * | 6/2010 | Batistatos et al. | 349/124 |

FOREIGN PATENT DOCUMENTS

TW   200813533   3/2008

OTHER PUBLICATIONS

Woo et al., "UV photoalignment technology comparable to the rubbing alignment method in terms of the azimuthal anchoring energy," The 15th International Display Workshops, Dec. 3-5, 2008, pp. 37-38.

* cited by examiner

*Primary Examiner* — Huyen Ngo
(74) *Attorney, Agent, or Firm* — J.C. Patents (57) ABSTRACT

A first substrate and a second substrate are provided. An alignment process is performed on a surface of the first substrate and a surface of the second substrate respectively. A liquid crystal mixture is prepared, where the liquid crystal mixture includes a liquid crystal molecule and a liquid crystal monomer having a functional group of diacrylates, and the liquid crystal monomer having the functional group of diacrylates occupies 0.01-2 wt % of the liquid crystal mixture. The first substrate and the second substrate are assembled, and the liquid crystal mixture is filled therebetween. A polymerization curing process is performed such that the liquid crystal monomer having the functional group of diacrylates is polymerized to respectively form a liquid crystal polymer film on the aligned surfaces of the first and second substrates. The method enhances anchoring energy and reduces problems of V-T shift, surface gliding, and residual image.

12 Claims, 9 Drawing Sheets

METHOD OF FABRICATING LIQUID CRYSTAL DISPLAY

CROSS-REFERENCE TO RELATED APPLICATION

This application claims the priority benefit of Taiwan application serial no. 98136316, filed on Oct. 27, 2009. The entirety of the above-mentioned patent application is hereby incorporated by reference herein and made a part of specification.

BACKGROUND OF THE INVENTION

1. Field of the Invention

The invention relates to a method of fabricating a display, and more particularly to a method of fabricating a liquid crystal display (LCD).

2. Description of Related Art

Along with the great advancement of computer performance and the rapid development of the Internet and multimedia technology, the volume of video or image apparatus is getting smaller and lighter. In the development of displays, liquid crystal displays (LCDs) having such advantages as high image quality, high space efficiency, low power consumption, and free of radiation have become the major products in display market along with the advancement of photoelectronic techniques and semiconductor fabricating techniques.

An LCD panel includes a backlight module and a LCD, and a conventional LCD is composed of two substrates and a liquid crystal layer filled between the two substrates. Generally, during the fabricating process of an LCD, alignment films are formed on both substrates so that liquid crystal molecules are arranged in a particular arrangement. A conventional method to arrange liquid crystal molecules is to perform an alignment process to an alignment material after the alignment material has been coated over a substrate. The alignment process is categorized into contact alignment process and non-contact alignment process. The non-contact alignment process can resolve the problems such as static produced by contact rubbing alignment and particle contamination, but it exist the problem of insufficient anchoring energy of the alignment surface. Insufficient anchoring energy of an alignment surface usually results in poor display quality of the LCD. Methods disclosed in publications for solving insufficient anchoring energy in the non-contact alignment process mostly include development of new materials for alignment films. However, the new materials developed are incapable of satisfying demands for mass production.

SUMMARY OF THE INVENTION

A method of fabricating a liquid crystal display (LCD) is provided. In the method, a first substrate and a second substrate are provided. Next, an alignment process is performed respectively on a surface of the first substrate and a surface of the second substrate. A liquid crystal mixture is then prepared. The liquid crystal mixture includes a liquid crystal molecule and a liquid crystal monomer having a functional group of diacrylates. The liquid crystal monomer having the functional group of diacrylates occupies 0.01-2 wt % of the liquid crystal mixture. The first substrate and the second substrate are assembled and the liquid crystal mixture is filled therebetween. A polymerization curing process is performed so that the liquid crystal monomer having the functional group of diacrylates in the liquid crystal mixture is polymerized to respectively form a liquid crystal polymer film on the aligned surfaces of the first substrate and the second substrate.

Another method of fabricating an LCD is provided. In the method, a first substrate and a second substrate are provided. A first alignment material layer is formed on a surface of the first substrate and a second alignment material layer is formed on a surface of the second substrate. A non-contact alignment process is performed respectively to the first alignment material layer and the second alignment material layer. A liquid crystal mixture is then prepared. The liquid crystal mixture includes a liquid crystal molecule and a liquid crystal monomer having a functional group of diacrylates. The liquid crystal monomer having the functional group of diacrylates occupies 0.01-2 wt % of the liquid crystal mixture. The first substrate and the second substrate are assembled and the liquid crystal mixture is filled therebetween. A polymerization curing process is performed, so that the liquid crystal monomer having the functional group of diacrylates in the liquid crystal mixture is polymerized to respectively form a liquid crystal polymer film on the first alignment material layer of the first substrate and the second alignment material layer of the second substrate.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1A:
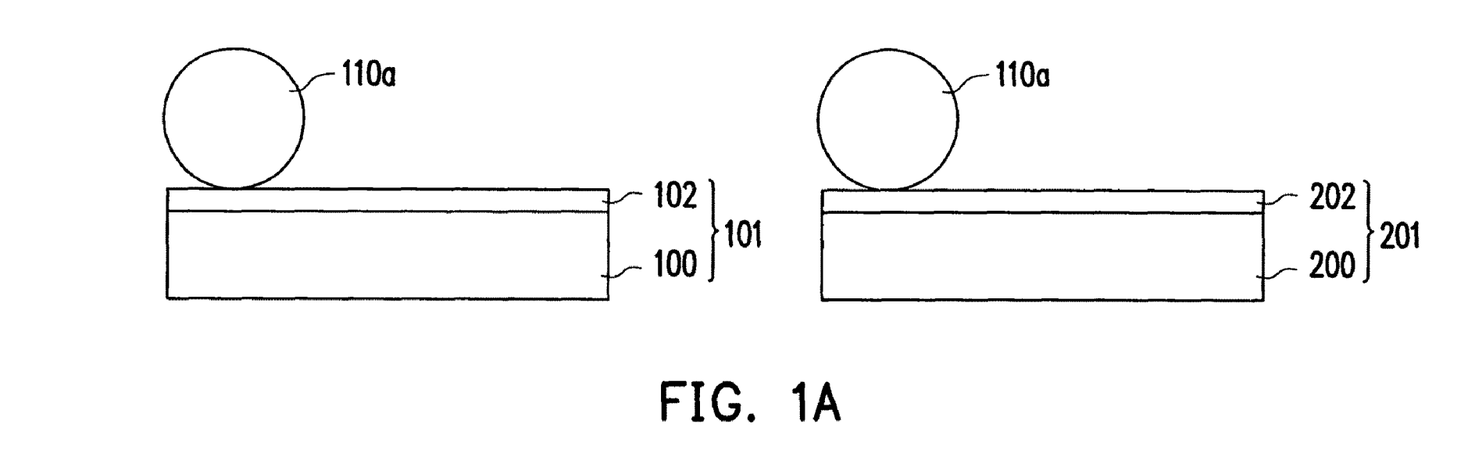
FIGS. 1A and 1B are schematic views of an alignment process according to an embodiment of the invention.
Figure 1B:
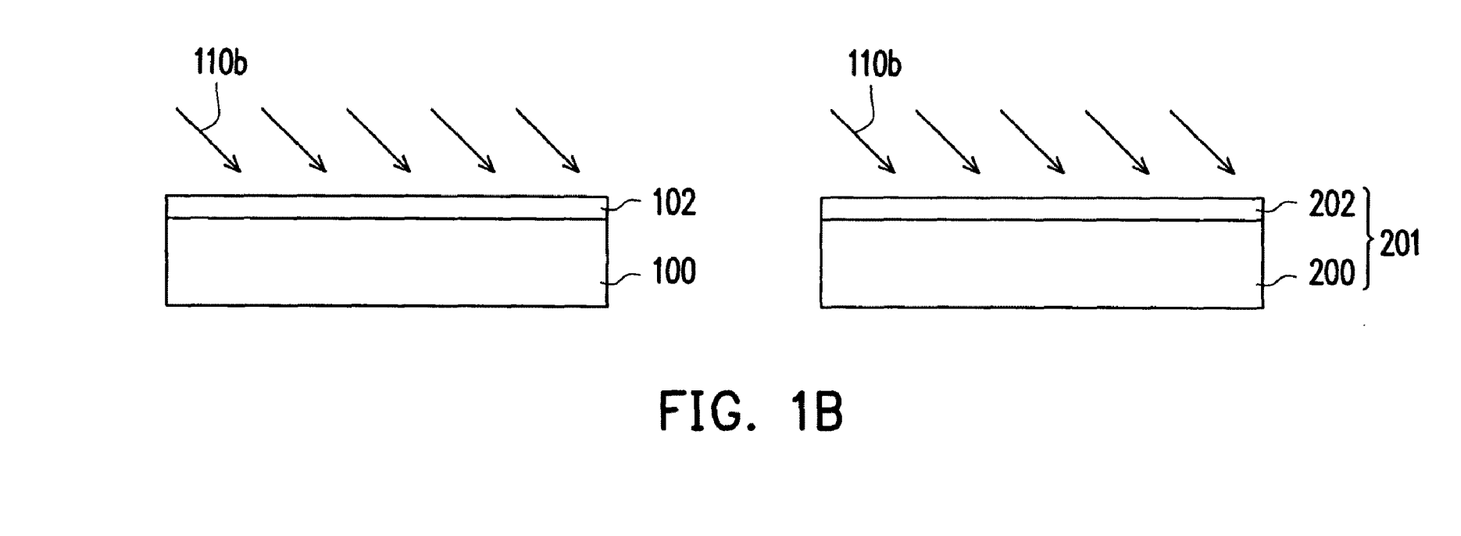
Figure 2:
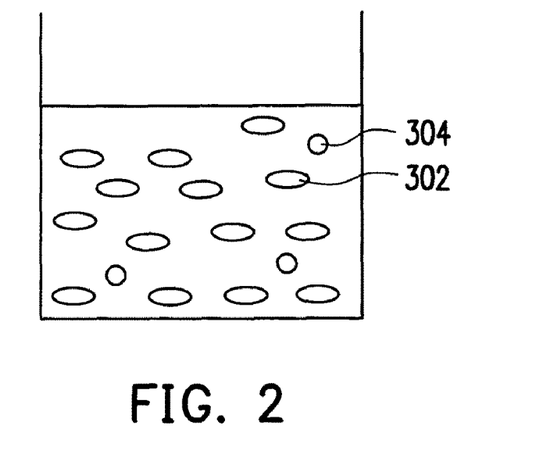
FIGS. 2 to 4 are schematic cross-sectional views illustrating a fabrication flowchart following FIG. 1A or FIG. 1B.
Figure 3:
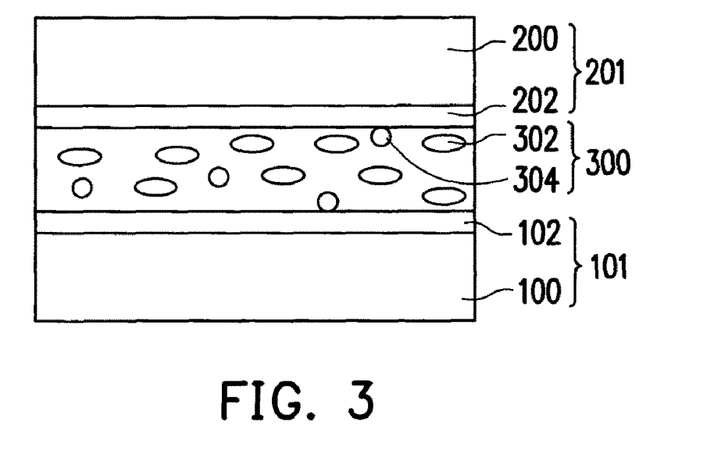
Figure 4:
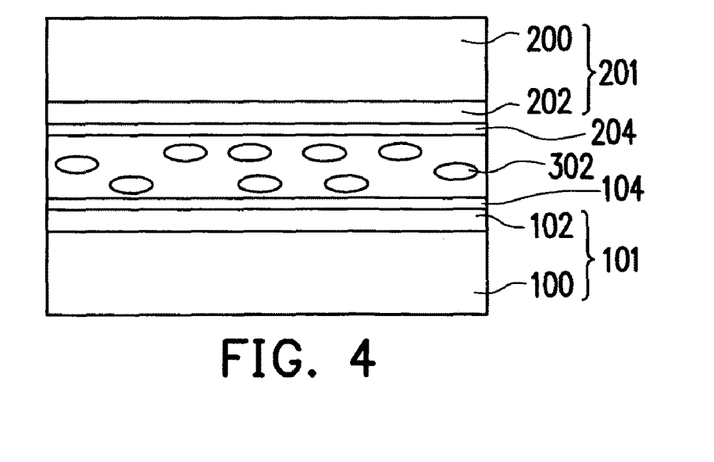

FIGS. 1A and 1B are schematic views of an alignment process according to an embodiment of the invention. FIGS. 2 to 4 are schematic cross-sectional views illustrating a fabrication flowchart following FIG. 1A or FIG. 1B.

The present embodiment provides a method of fabricating a liquid crystal display (LCD). Referring to FIG. 1A, a first substrate 101 and a second substrate 201 are first provided. The first substrate 101, for example, is an active device array substrate or a passive matrix substrate. The second substrate 201, for example, is a color filter substrate or a counter substrate. More specifically, the first substrate 101 is constituted by a substrate 100 and a film 102 formed on the substrate 100. The second substrate 201 is constituted by a substrate 200 and a film 202 formed on the substrate 200. The substrates 100, 200 are glass substrates, silicon substrates, flexible plastic substrates, or other substrates known to be adopted in displays. When the display of the invention is a passive display, the films 102 and 202 are each an electrode layer, for instance. When the display of the invention is an active display, the film 102 is then an active device array layer, for example, and the film 202 is, for example, an electrode layer, a color filter array layer, or a combination thereof. The electrode layer is, for example, made of organic conductive material which includes, for instance, poly(3,4-ethylene dioxythiophene), PEDOT, and so on, or inorganic conductive material which includes, for instance, indium tin oxide, indium zinc oxide, and so on. According to other embodiments of the invention, the films 102 and 202 not only can be the above-mentioned conductive layer (electrode layer or active device array layer), a surface layer of each film 102 and each film 202 also can be an insulating layer. That is, an insulating layer is further covered on the electrode layer or the active device array layer, for example. The insulating layer is a passivation layer, an overcoat layer, or a planarization layer. The insulating layer is made of organic insulating material or inorganic insulating material, for instance.

Referring to FIG. 1A, an alignment process 110a is respectively performed on a surface of the first substrate 101 and a surface of the second substrate 201. In details, the alignment process is performed on the film 102 on the surface of the first substrate 100 and the film 202 on the surface of the second substrate 200. In the embodiment of FIG. 1A, the alignment process 110a is a contact alignment process, such as a rubbing alignment process, a nano imprinting process, or an atomic force microscopy probe contact alignment process.

However, according to another embodiment of the invention, the alignment process can also adopt a non-contact alignment process 110b, as shown in FIG. 1B. The non-contact alignment process 110b includes a particle beam alignment process or a photo alignment process. The particle beam alignment process is, for example, an ion beam alignment process, an electron beam alignment process, a plasma alignment process, or an oblique vapor deposition process. That is, the non-contact alignment is performed on the surfaces of the first substrate 101 and the second substrate 201 by using ion beam, electron beam, plasma, or oblique vapor deposition. In addition, the photo alignment process is, for instance, a photo-polymerization alignment process, a photo-decomposition alignment process, or a photo-isomerization alignment process. In the foregoing photo alignment process, the surfaces of the first substrate 101 and the second substrate 201 are illuminated to induce polymerization reaction, decomposition reaction, or isomerization reaction.

According to another embodiment, the alignment processes 110a and 110b can be multi-domain alignment processes, namely, a multi-domain alignment process is performed on at least the surfaces of the first substrate 101 and the second substrate 201. Thus, different domains on the surfaces of the first substrate 101 and the second substrate 201 have different alignment directions.

Next, referring to FIG. 2, a liquid crystal mixture 300 is prepared. The liquid crystal mixture 300 includes a liquid crystal molecule 302 and a liquid crystal monomer 304 having a functional group of diacrylates. Moreover, the liquid crystal monomer 304 having the functional group of diacrylates occupies 0.01-2 wt % of the liquid crystal mixture 300. In one embodiment, the liquid crystal monomer 304 having the functional group of diacrylates preferably occupies 0.01-1 wt % of the liquid crystal mixture 300. In another embodiment, the liquid crystal monomer 304 having the functional group of diacrylates more preferably occupies 0.25-1 wt % of the liquid crystal mixture 300. The liquid crystal molecule 302, for instance, is a nematic liquid crystal molecule. The liquid crystal monomer 304 having the functional group of diacrylates is a liquid crystal monomer having the functional group of diacrylates which is polymerized with a photo reaction or a thermal reaction. In other words, the liquid crystal monomer 304 having the functional group of diacrylates illustrated in the present embodiment means that the liquid crystal monomer having the functional group of diacrylates is polymerized after irradiation or heating. Additionally, in one embodiment, a method of preparing the liquid crystal mixture 300 includes the following. The liquid crystal molecule 302 and the liquid crystal monomer 304 having the functional group of diacrylates are mixed and heated to a liquid state for mixing evenly. According to another embodiment of the invention, a method of preparing the liquid crystal mixture 300 includes the following. The liquid crystal molecule 302 and the liquid crystal monomer 304 having the functional group of diacrylates are first dissolved into a liquid state using a solvent. Then, the liquid crystal molecule 302 and the liquid crystal monomer 304 having the functional group of diacrylates are mixed.

Thereafter, referring to FIG. 3, the first substrate 101 and the second substrate 102 are assembled and the liquid crystal mixture 300 is filled therebetween. Generally, this step adopts a sealant to adhere the two substrates 101, 201, and the liquid crystal mixture 300 is vacuum injected between the two substrates 101, 201. Alternatively, a one drop fill technique is adopted to fill the liquid crystal mixture 300 between the two substrates 101, 201.

A processing procedure is then performed, so that the liquid crystal monomer 304 having the functional group of diacrylates in the liquid crystal mixture 300 of FIG. 3 is polymerized to form a liquid crystal polymer film 104 and a liquid crystal polymer film 204 respectively on the aligned surface of the first substrate 101 and the aligned surface of the second substrate 201. The foregoing processing procedure includes an ultraviolet irradiation procedure or a heating procedure.

In the present embodiment, not only is the alignment process performed on the surfaces of the first substrate 101 and the second substrate 201, the liquid crystal polymer films 104, 204 as shown in FIG. 4 are further formed on the aligned surfaces of the first substrate 101 and the second substrate 201. The liquid crystal polymer films 104, 204 are adopted as alignment auxiliary layers to improve insufficient anchoring energy of the LCD, thereby enhancing display quality of the LCD.

Figure 9A:
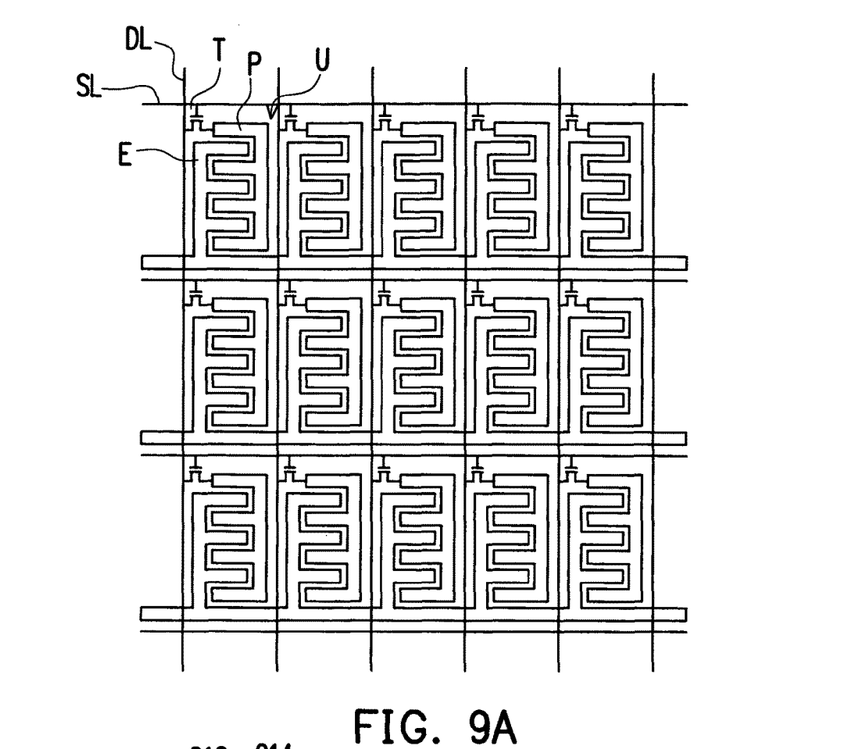
FIGS. 9A and 9B respectively show a schematic top view illustrating devices of a first substrate and a second substrate of an LCD in an IPS mode.

It should be noted that the fabrication method of the present embodiment is effective in enhancing anchoring energy of the LCD in an in-plane switching (IPS) mode. Generally, devices of the first substrate 101 and the second substrate 202 of the LCD in the so-called IPS mode are respectively illustrated in FIGS. 9A and 9B. Moreover, a schematic cross-sectional view of the LCD in the IPS mode is shown in FIG. 10A. Referring to FIGS. 9A and 10A, the first substrate 101 includes a plurality of pixel units U, a plurality of data lines DL, and a plurality of scan lines SL. Each pixel unit U includes an active device T, a pixel electrode P, and a common electrode E. The active device T includes a gate G, a source S, a drain D, and a channel layer CH. An insulating layer 112 is covered on the gate G, and another insulating layer 114 is covered on the source S and the drain D. The gate G of the active device T is electrically connected to the scan lines SL. The source S of the active device T is electrically connected to the data lines DL. Moreover, the drain D of the active device T is electrically connected to the pixel electrode P. The common electrode E and the pixel electrode P within each pixel unit U are alternately disposed. The common electrode E and the pixel electrode P are isolated by an insulating layer 116. The common electrodes E within the pixel units U are all electrically connected to a common voltage.

Figure 9B:
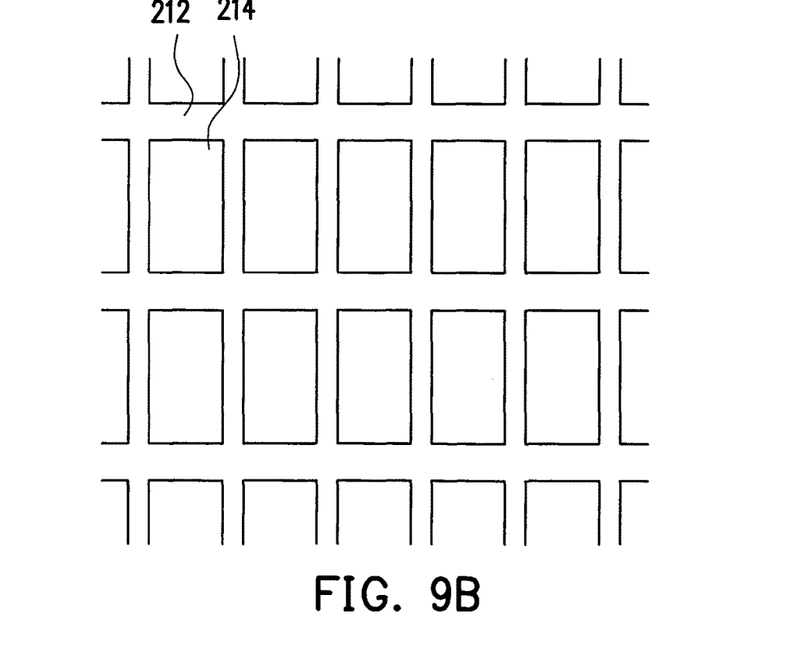
Figure 10A:
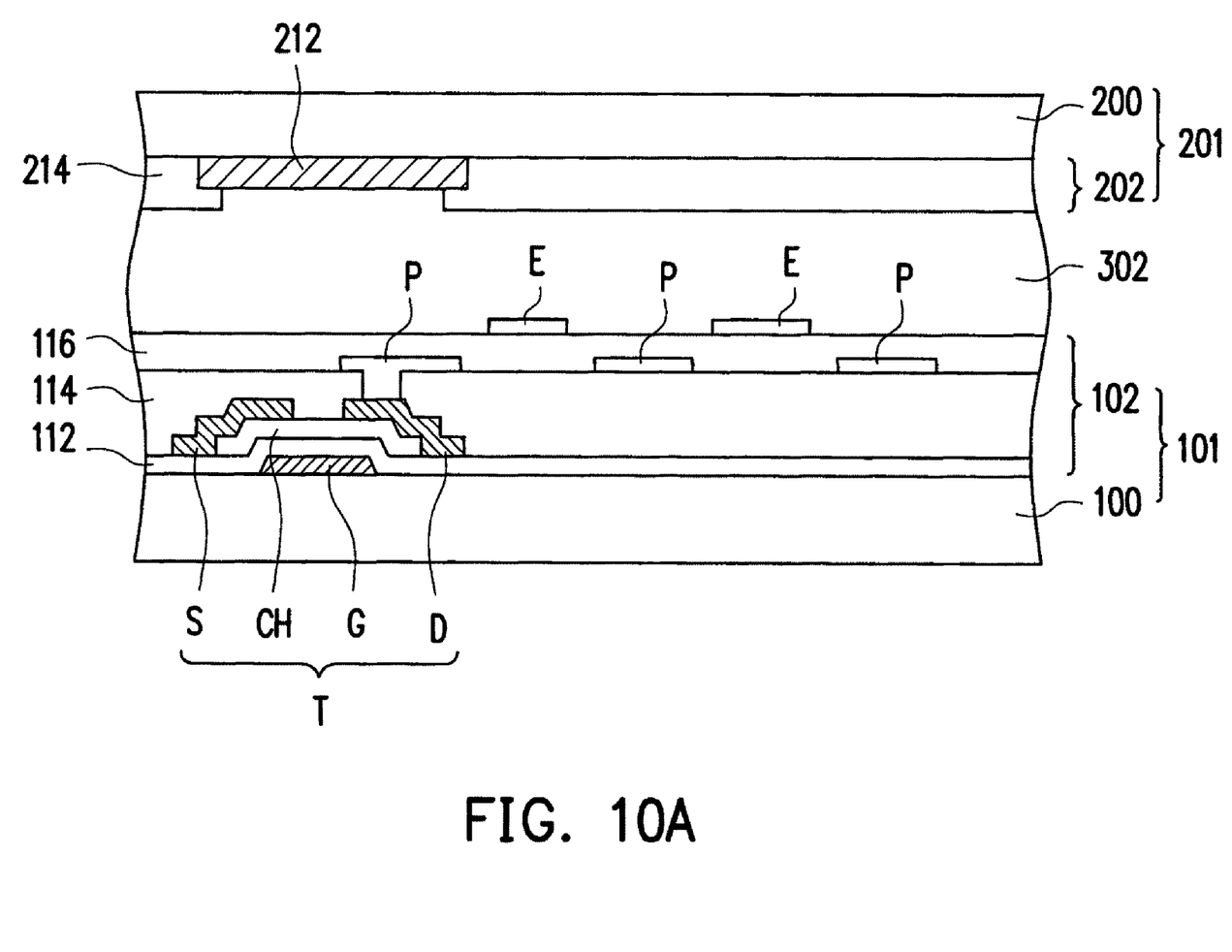
FIGS. 10A and 10B are schematic cross-sectional views illustrating the LCD in the IPS mode.

Referring to FIG. 9B and FIG. 10A, the second substrate 201 includes a color filter array 214. The color filter array 214 includes red filter patterns, green filter patterns, and blue filter patterns. Furthermore, a shielding pattern layer 212 is formed between the patterns of the color filter array 214, and the shielding pattern layer 212 is made of metal or black resin, for example. The common electrodes of the LCD in the IPS mode are disposed on the first substrate 101. Thus, an electrode layer is not disposed on the second substrate 201.

Figure 10B:
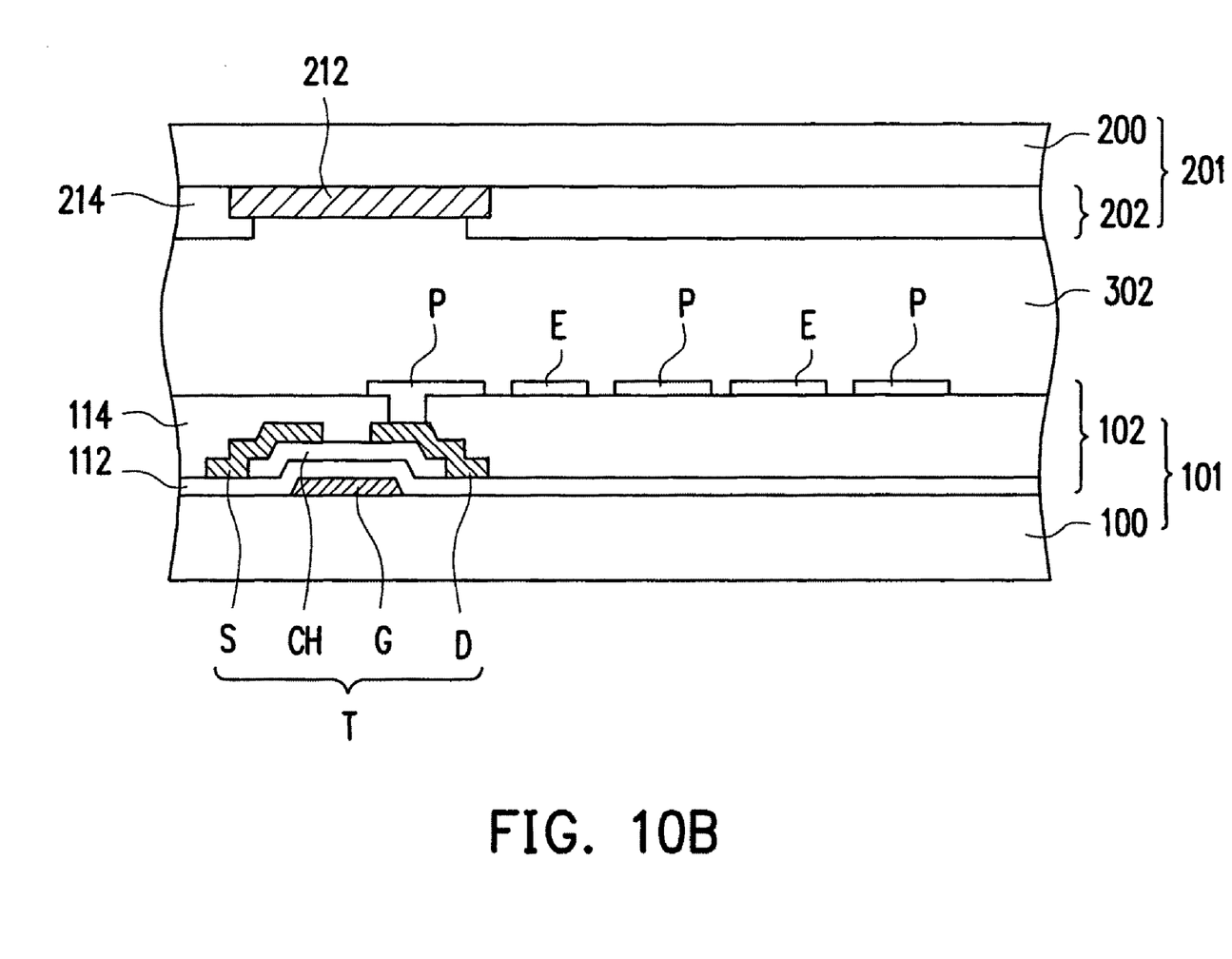

According to another embodiment of the invention, a schematic cross-sectional view of the LCD in the IPS mode is illustrated in FIG. 10B. The embodiment in FIG. 10B and the embodiment in FIG. 10A are similar, thus the same components are denoted by the same numerals. The embodiment in FIG. 10B and the embodiment in FIG. 10A are different in that the common electrode E and the pixel electrode P are located on the same film and isolated from each other. Consequently, the common electrode E and the pixel electrode P are electrically isolated.

It should be noted that the invention is not limited to be adopted in the LCD in the IPS mode. According to other embodiments, the invention is also applied in a method of fabricating the LCD twist nematic (TN) LCD, super twist nematic (STN) LCD, vertical alignment (VA) LCD, or LCDs of other modes.

Second Embodiment

Figures 5, 6:
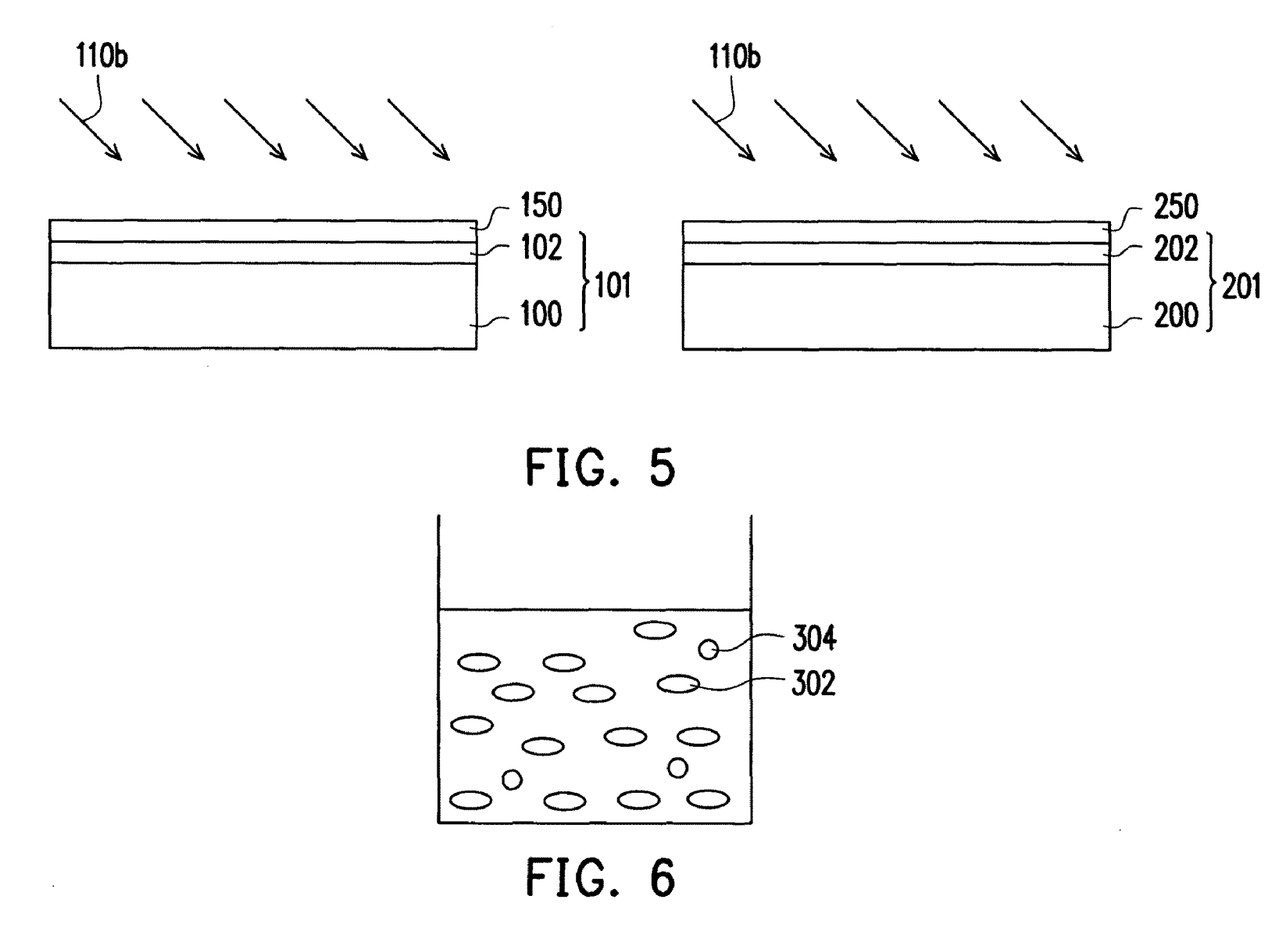
FIGS. 5 to 8 are schematic cross-sectional views illustrating a flowchart of fabricating a liquid crystal display (LCD) according to a second embodiment of the invention.

FIGS. 5 to 8 are schematic cross-sectional views illustrating a flowchart of fabricating an LCD according to a second embodiment of the invention. Referring to FIG. 5, firstly, a first substrate 101 and a second substrate 201 are provided. The first substrate 101 is constituted by a substrate 100 and a film 102 formed on the substrate 100. The second substrate 201 is constituted by a substrate 200 and a film 202 formed on the substrate 200. The compositions and materials of the first and the second substrates 101, 201 are the same as those illustrated in the first embodiment, and thus not repeated herein.

Thereafter, a first alignment material layer 150 is formed on the film 102 of the first substrate 101, and a second alignment material layer 250 is formed on the film 202 of the second substrate 201. The first and the second alignment material layers 150, 250 are each an organic alignment material or an inorganic alignment material. In one embodiment, the organic alignment material includes poly vinyl alcohol, polyimide, polyamic acid, Azo-benzene, poly vinyl cinnamate, a compound containing coumarin group, a compound containing chalcone groups, or other known organic alignment materials. The inorganic alignment material includes diamond-like carbon, $SiO_x$, $SiN_x$, or other known inorganic alignment materials.

Next, a non-contact alignment process 110b is performed to the first and the second alignment material layers 150, 250. The non-contact alignment process 110b is, for instance, a particle beam alignment process or a photo alignment process. The particle alignment process is, for example, an ion beam alignment process, an electron beam alignment process, a plasma alignment process, or an oblique vapor deposition process. Furthermore, the photo alignment process is, for instance, a photo-polymerization alignment process, a photo-decomposition alignment process, or a photo-isomerization alignment process. Similarly, the non-contact alignment process 110b can also be the multi-domain alignment process described above.

Referring to FIG. 6, a liquid crystal mixture 300 is prepared. The liquid crystal mixture 300 includes a liquid crystal molecule 302 and a liquid crystal monomer 304 having a functional group of diacrylates. Moreover, the liquid crystal monomer 304 having the functional group of diacrylates occupies 0.01-2 wt % of the liquid crystal mixture 300. In one embodiment, the liquid crystal monomer 304 having the functional group of diacrylates preferably occupies 0.01-1 wt % of the liquid crystal mixture 300. In another embodiment, the liquid crystal monomer 304 having the functional group of diacrylates more preferably occupies 0.25-1 wt % of the liquid crystal mixture 300. The liquid crystal molecule 302, for instance, is a nematic liquid crystal molecule. The liquid crystal monomer 304 having the functional group of diacrylates is a liquid crystal monomer having the functional group of diacrylates which is polymerized with a photo reaction or a thermal reaction. In other words, the liquid crystal monomer 304 having the functional group of diacrylates illustrated in the present embodiment means that the liquid crystal monomer having the functional groups of diacrylates is polymerized after irradiation or heating. Additionally, in one embodiment, a method of fabricating the liquid crystal mixture 300 includes the following. The liquid crystal molecule 302 and the liquid crystal monomer 304 having the functional group of diacrylates are mixed and heated to a liquid state for mixing evenly. According to another embodiment of the invention, a method of preparing the liquid crystal mixture 300 includes the following. The liquid crystal molecule 302 and the liquid crystal monomer 304 having the functional group of diacrylates are first dissolved into a liquid state using a solvent. Then, the liquid crystal molecule 302 and the liquid crystal monomer 304 having the functional group of diacrylates are mixed.

Figure 7:
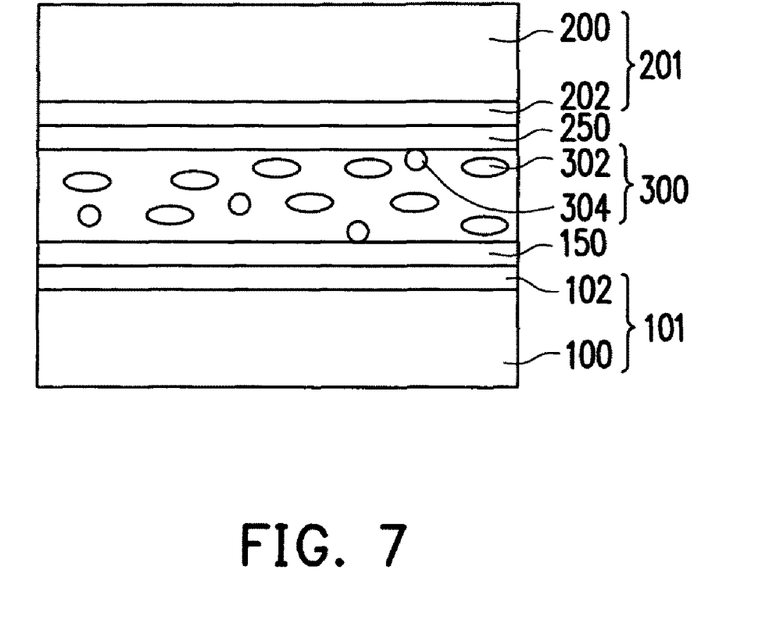

Afterwards, referring to FIG. 7, the first substrate 101 and the second substrate 201 are assembled and the liquid crystal mixture 300 is filled therebetween. Generally, this step adopts a sealant to adhere the two substrates 101, 201, and the liquid crystal mixture 300 is vacuum injected between the two substrates 101, 201. Alternatively, a one drop fill technique is adopted to fill the liquid crystal mixture 300 between the two substrates 101, 201.

Figure 8:
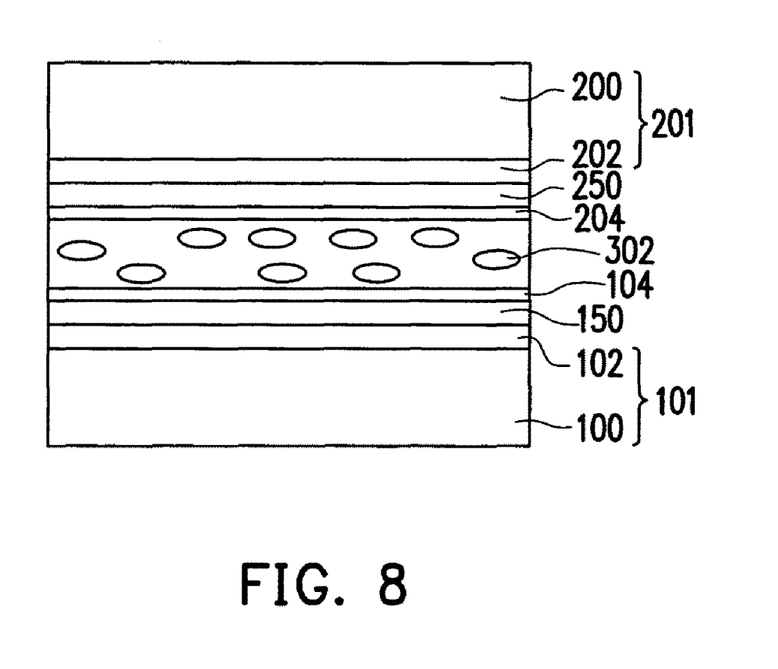

Subsequently, a processing procedure is performed such that the liquid crystal monomer 304 having the functional group of diacrylates in the liquid crystal mixture 300 in FIG. 7 is polymerized to form a liquid crystal polymer film 104 on the first alignment material layer 150 of the first substrate 101 and a liquid crystal polymer film 204 on the second alignment material layer 250 of the second substrate 201. The foregoing processing procedure includes an ultraviolet irradiation procedure or a heating procedure.

Similarly, in the present embodiment, not only is the alignment process performed on the first alignment material 150 and the second alignment material 250, the liquid crystal polymer films 104, 204 are further formed on the first alignment material 150 and the second alignment material 250. The liquid crystal polymer films 104, 204 are adopted as alignment auxiliary layers of the first alignment material 150 and the second alignment material 250 to improve insufficient anchoring energy of the LCD, thereby enhancing display quality thereof.

Also, the present embodiment is effective in enhancing anchoring energy of the LCD in the IPS mode. The LCD in the so-called IPS mode has been illustrated above (as shown in FIGS. 9A, 9B, and 10), and is thus not repeated herein. Likewise, the foregoing method is not limited to be applied in the LCD in the IPS mode. According to other embodiments, the foregoing method is also applied in fabricating the LCD i TNLCD, STNLCD, VALCD, or LCDs of other modes.

Several embodiments are exemplified below to illustrate that the method of the invention is capable of enhancing the anchoring energy of the LCD.

First Example

An LCD of the First Example is an LCD in an IPS mode, where the LCD is formed by using the method described in the First Embodiment. That is, after a rubbing alignment process is performed directly on surfaces of the first substrate and the second substrate (no alignment material layers are present on the first substrate and the second substrate), the two substrates are assembled and a liquid crystal mixture is filled therebetween. Here, liquid crystal molecules in the adopted liquid crystal mixtures are all ZOC-5084XX (manufactured by Chisso). However, liquid crystal monomers used are compared in the following three experiments. Among these, Experiment 1 applies a liquid crystal monomer RMM-256C having a functional group of diacrylates (manufactured by Merck), and Experiment 2 adopts a liquid crystal monomer RMM-491 having a functional group of diacrylates (manufactured by Merck). However, Experiment 3 uses a liquid crystal monomer UCL-001 having a functional group of acrylate (manufactured by DIC). The liquid crystal monomer having the functional group of diacrylates in the Experiments 1 and 2 and the liquid crystal monomer having the functional group of acrylate in the Experiment 3 are irradiated by ultraviolet light (2 J/cm$^2$) to polymerize, so that a liquid crystal polymer film is respectively formed on the aligned surfaces of the first and the second substrates.

Figure 11:
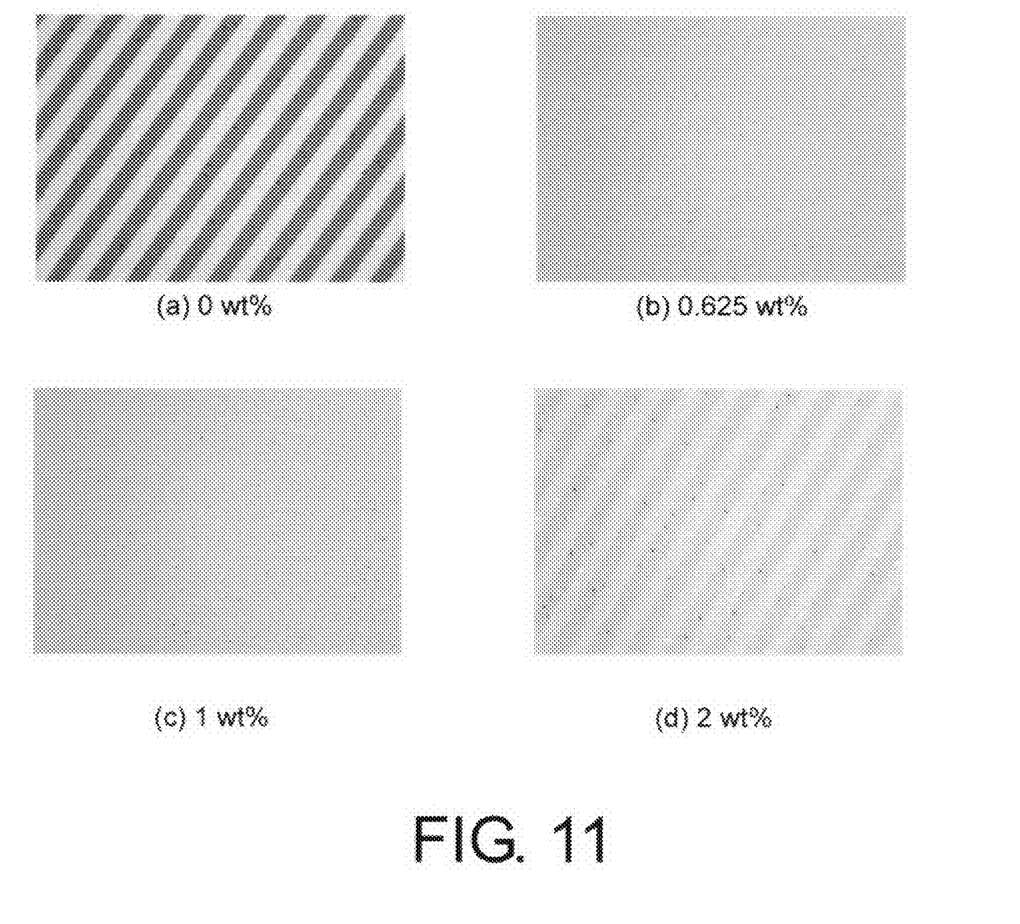
FIG. 11 shows surface gliding of an LCD under a polarized microscope, where the LCD is fabricated by adopting a First Example and has been driven for an hour under 40 Vpp.

FIG. 11 shows surface gliding of the LCD under a polarized microscope, where the LCD is fabricated by adopting the First Example and has been driven for an hour under 40 Vpp. FIGS. 11(a) to 11(d) respectively show experimental results in the Experiment 1 with concentrations of liquid crystal monomers having the functional group of diacrylates being 0 wt %, 0.625 wt %, 1 wt %, and 2 wt % respectively. As shown in FIG. 11, under conditions of 0.625 wt % and 1 wt %, the LCDs show no surface gliding. On the other hand, under conditions of 0 wt % and 2 wt %, the LCDs show surface gliding.

Table 1 lists the Experiments 1, 2, 3 and Comparative Example 1 with the LCD manufactured by adopting the method in the First Example. The experiment is performed by comparing the difference in V-T curves measured before and after aging of the display. The condition of aging is to drive the LCD for an hour under 40 Vpp. From the result, it is shown that the liquid crystal polymer film is formed by the liquid crystal monomer having the functional group of diacrylates added in the liquid crystal mixture after the ultraviolet irradiation process in the Experiment 1 and the Experiment 2. The liquid crystal polymer film is capable of reducing the percentage of V-T shift. However, the liquid crystal monomer having the functional group of acrylate adopted in the Experiment 3 increases the percentage of shift. It is thus shown that the liquid crystal monomer having the functional group of diacrylates can reduce the percentage of V-T shift effectively.

TABLE 1

| | Percentage of liquid crystal monomer having the functional group of diacrylates | Percentage of liquid crystal monomer having the functional group of acrylate | Percentage of V-T shift |
|---|---|---|---|
| Experiment 1 | 0.625 wt % | 0 wt % | 0.011% |
| Experiment 2 | 0.625 wt % | 0 wt % | 0.971% |
| Experiment 3 | 0 wt % | 0.625 wt % | 15.261% |
| Comparative Example 1 | 0 wt % | 0 wt % | 6.430% |

Second Example

An LCD of the Second Example is an LCD in an IPS mode, where the LCD is formed by using the method described in the Second Embodiment. That is, the first alignment material and the second alignment material are respectively formed on the first substrate and the second substrate. A non-contact alignment process is then performed. The two substrates are assembled subsequently, and the liquid crystal mixture is filled therebetween. The foregoing non-contact alignment process adopts the ion beam alignment process. Herein, liquid crystal molecules in the adopted liquid crystal mixtures are all ZOC-5084XX (manufactured by Chisso). Nevertheless, liquid crystal monomers used are compared in the following three experiments. Among these, Experiment 4 applies a liquid crystal monomer RMM-256C having a functional group of diacrylates (manufactured by Merck), and Experiment 5 adopts a liquid crystal monomer RMM-491 having a functional group of diacrylates (manufactured by Merck). However, Experiment 6 uses a liquid crystal monomer UCL-001 having a functional group of acrylate (manufactured by DIC). Moreover, a material of an alignment film is SE-7492 (manufactured by Nissan). The liquid crystal monomer having the functional group of diacrylates in the Experiments 4 and 5 and the liquid crystal monomer having the functional group of acrylate in the Experiment 6 are irradiated by ultraviolet light (2 J/cm$^2$) to polymerize, so that a liquid crystal polymer film is respectively formed on the first alignment material and the second alignment material.

Figure 12:
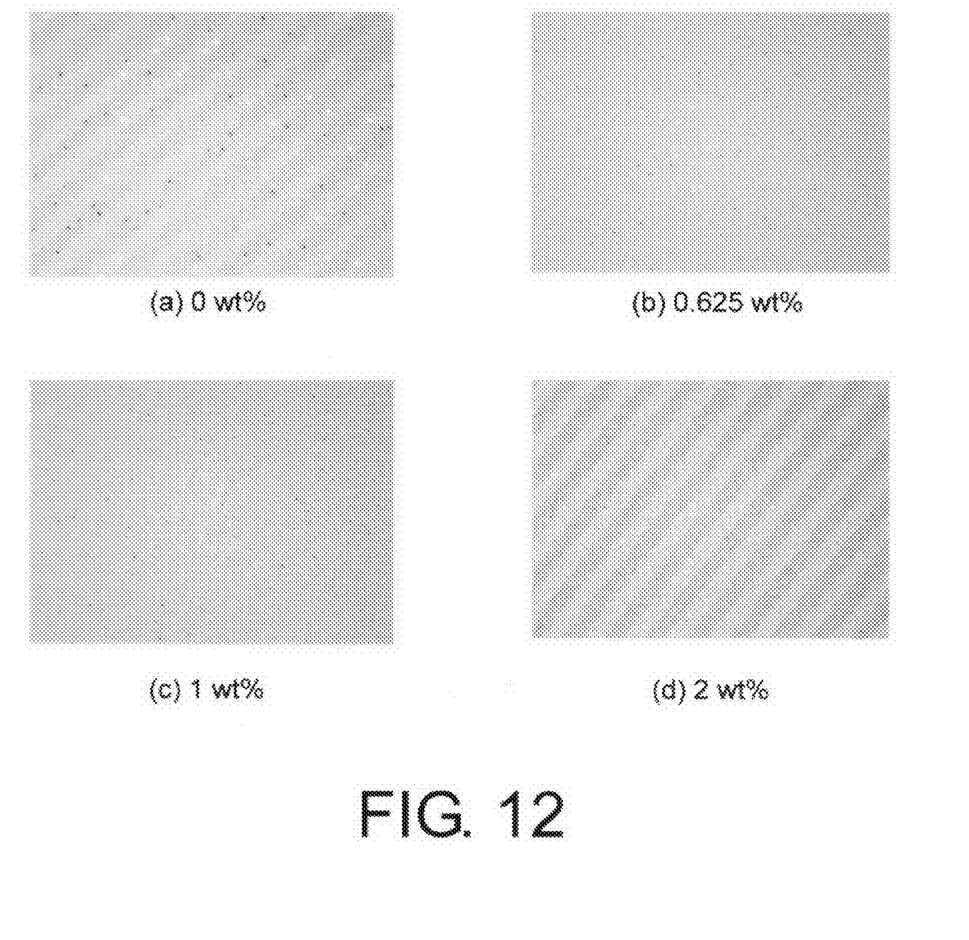
FIG. 12 shows surface gliding of an LCD under a polarized microscope, where the LCD is fabricated by adopting a Second Example and has been driven for an hour under 40 Vpp.

FIG. 12 shows surface gliding of the LCD under a polarized microscope, where the LCD is fabricated by adopting the Second Example and has been driven for an hour under 40 Vpp. FIGS. 12(a) to 12(d) respectively show experimental results in the Experiment 4 with concentrations of liquid crystal monomers having the functional group of diacrylates being 0 wt %, 0.625 wt %, 1 wt %, and 2 wt % respectively. As shown in FIG. 12, under conditions of 0.625 wt % and 1 wt %, the LCDs show no surface gliding. On the other hand, under conditions of 0 wt % and 2 wt %, the LCDs show surface gliding.

Table 2 lists the Experiments 4, 5, 6 and Comparative Example 2 with the LCD manufactured by adopting the method in the Second Example. The experiment is performed by comparing the difference in V-T curves measured before and after aging of the display. The condition of aging is to drive the LCD for an hour under 40 Vpp. From the result, it is shown that the liquid crystal polymer film is formed by the liquid crystal monomer having the functional group of diacrylates added in the liquid crystal mixture after the ultraviolet irradiation process in the Experiment 4 and the Experiment 5. The liquid crystal polymer film is capable of reducing the percentage of V-T shift of the display. However, the liquid crystal monomer having the functional group of acrylate adopted in the Experiment 6 increases the percentage of V-T shift. It is thus shown that liquid crystal mixture containing liquid crystal monomer having the functional group of diacrylates can reduce the percentage of V-T shift of the LCD effectively.

TABLE 2

|  | Percentage of liquid crystal monomer having the functional group of diacrylates | Percentage of liquid crystal monomer having the functional group of acrylate | percentage of V-T shift |
|---|---|---|---|
| Experiment 4 | 0.625 w % | 0 wt % | 0.011% |
| Experiment 5 | 0.625 wt % | 0 wt % | 0.001% |
| Experiment 6 | 0 wt % | 0.625 wt % | 13.170% |
| Comparative Example 2 | 0 wt % | 0 wt % | 3.373% |

Further, Table 3 lists the Example 4 and Comparative Example 2 which adopt the LCD fabricated with the method shown in the Second Example. It is thus illustrated that the liquid crystal polymer film formed by the liquid crystal mixture added with the liquid crystal monomer having the functional group of diacrylates is capable of enhancing the anchoring energy of the LCD.

TABLE 3

|  | Percentage of liquid crystal monomer having the functional group of diacrylates | Anchoring energy (J/m$^2$) |
|---|---|---|
| Experiment 4 | 0.625 wt % | $1.030 \times 10^{-3}$ |
| Comparative Example 2 | 0 wt % | $2.505 \times 10^{-4}$ |

Third Example

An LCD of the Third Example is an LCD in an IPS mode, where the LCD is formed by using the method described in the Second Embodiment. That is, the first alignment material and the second alignment material are respectively formed on the first substrate and the second substrate. A non-contact alignment process is then performed. The two substrates are assembled subsequently, and the liquid crystal mixture is filled therebetween. The foregoing non-contact alignment process adopts the photo alignment process. Here, liquid crystal molecules in the adopted liquid crystal mixtures are all ZOC-5084XX (manufactured by Chisso). Nevertheless, liquid crystal monomers used are compared in the following three experiments. Among these, Experiment 7 applies a liquid crystal monomer RMM-256C having a functional group of diacrylates (manufactured by Merck), and Experiment 8 adopts a liquid crystal monomer RMM-491 having a functional group of diacrylates (manufactured by Merck). However, Experiment 9 uses a liquid crystal monomer UCL-001 having a functional group of acrylate (manufactured by DIC). Moreover, a material of an alignment film is RN-1349 (manufactured by Nissan). The liquid crystal monomer having the functional group of diacrylates in the Experiments 7 and 8 and the liquid crystal monomer having the functional group of acrylate in the Experiment 9 are irradiated by ultraviolet light (2 J/cm$^2$) to polymerize, so that a liquid crystal polymer film is respectively formed on the first alignment material and the second alignment material.

Table 4 lists the Experiments 7, 8, 9 and Comparative Example 3 with the LCD manufactured by adopting the method in the Third Example. The experiment is performed by comparing the difference in V-T curves measured before and after aging of the display. The condition of aging is to drive the LCD for an hour under 40 Vpp. From the result, it is shown that the liquid crystal polymer film is formed by the liquid crystal monomer having the functional group of diacrylates added in the liquid crystal mixture after the ultraviolet irradiation process in the Experiment 7 and the Experiment 8. The liquid crystal polymer film is capable of reducing the percentage of V-T shift of the display. However, the liquid crystal monomer having the functional group of acrylate adopted in the Experiment 9 increases the percentage of V-T shift. It is thus understood that liquid crystal mixture containing liquid crystal monomer having the functional group of diacrylates can reduce the percentage of V-T shift of the LCD effectively.

TABLE 4

|  | Percentage of liquid crystal monomer having the functional group of diacrylates | Percentage of liquid crystal monomer having the functional group of acrylate | percentage of V-T shift |
|---|---|---|---|
| Experiment 7 | 0.625 wt % | 0 wt % | 0.971% |
| Experiment 8 | 0.625 wt % | 0 wt % | 0.270% |
| Experiment 9 | 0 wt % | 0.625 wt % | 2.856% |
| Comparative Example 3 | 0 wt % | 0 wt % | 2.197% |

In summary, in the invention, the liquid crystal polymer layer is formed on the aligned surfaces of the substrates or the alignment material layers as alignment auxiliary layer, such that the anchoring energy of alignment can be greatly increased so as to enhance display quality of the LCD.

Additionally, in the invention, the formation of liquid crystal polymer layer in the LCD enhances the anchoring energy of the LCD and improves the surface gliding and V-T curve shift, thereby enhancing optical feature of the LCD, such as reducing residual image and the like.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. A method of fabricating a liquid crystal display, the method comprising:
   providing a first substrate and a second substrate;
   forming a first alignment material layer on a surface of the first substrate and forming a second alignment material layer on a surface of the second substrate;
   performing a non-contact alignment process respectively to the first alignment material layer and the second alignment material layer;
   preparing a liquid crystal mixture, wherein the liquid crystal mixture comprises a liquid crystal molecule and a liquid crystal monomer having a functional group of diacrylates, and the liquid crystal monomer having the functional group of diacrylates occupies 0.01-2 wt % of the liquid crystal mixture;
   assembling the first substrate and the second substrate and filling the liquid crystal mixture therebetween; and
   performing a processing procedure so that the liquid crystal monomer having the functional group of diacrylates in the liquid crystal mixture is polymerized to respectively form a liquid crystal polymer film on the first alignment material layer of the first substrate and the second alignment material layer of the second substrate, wherein the method enhances anchoring energy of the liquid crystal display and reduces problems of V-T shift, surface gliding, and residual image.

2. The method of fabricating the liquid crystal display as claimed in claim 1, wherein the liquid crystal monomer having the functional group of diacrylates occupies 0.01-1 wt % of the liquid crystal mixture.

3. The method of fabricating the liquid crystal display as claimed in claim 1, wherein the liquid crystal monomer having the functional group of diacrylates occupies 0.25-1 wt % of the liquid crystal mixture.

4. The method of fabricating the liquid crystal display as claimed in claim 1, wherein the first substrate is an active device array substrate and the second substrate is a color filter substrate or a counter substrate.

5. The method of fabricating the liquid crystal display as claimed in claim 1, wherein the surface of the first substrate and the surface of the second substrate respectively comprise a conductive layer or an insulating layer.

6. The method of fabricating the liquid crystal display as claimed in claim 5, wherein the conductive layer on the surface of the first substrate comprises a pixel electrode and a common electrode, and the surface of the second substrate is the insulating layer.

7. The method of fabricating the liquid crystal display as claimed in claim 1, wherein the first alignment material and the second alignment material layer are respectively an organic alignment material or an inorganic alignment material.

8. The method of fabricating the liquid crystal display as claimed in claim 7, wherein the organic alignment material comprises poly vinyl alcohol, polyimide, polyamic acid, Azobenzene, poly vinyl cinnamate, a compound containing coumarin group or a compound containing chalcone groups.

9. The method of fabricating the liquid crystal display as claimed in claim 7, wherein the inorganic alignment material comprises diamond-like carbon, $SiO_x$, or $SiN_x$.

10. The method of fabricating the liquid crystal display as claimed in claim 1, wherein the non-contact alignment process comprises an ion beam alignment process, a photo alignment process, a plasma alignment process, or an oblique vapor-deposition process.

11. The method of fabricating the liquid crystal display as claimed in claim 1, wherein the processing procedure comprises an ultraviolet irradiation procedure or a heating procedure.

12. The method of fabricating the liquid crystal display as claimed in claim 1, wherein a method of preparing the liquid crystal mixture comprises mixing the liquid crystal molecule and the liquid crystal monomer having the functional group of diacrylates and heating the mixture to dissolve in a liquid state, or using a solvent to dissolve the liquid crystal molecule and the liquid crystal monomer having the functional group of diacrylates into a liquid state and then mixing the same.

* * * * *